INVENTOR
RICHARD W. KRITZER
by: [signature]
ATTY.

Aug. 13, 1963   R. W. KRITZER   3,100,679
APPARATUS FOR PURIFYING AIR IN INHABITABLE OR
PRODUCT-CONFINING ENCLOSURES
Filed Jan. 24, 1961   2 Sheets-Sheet 2
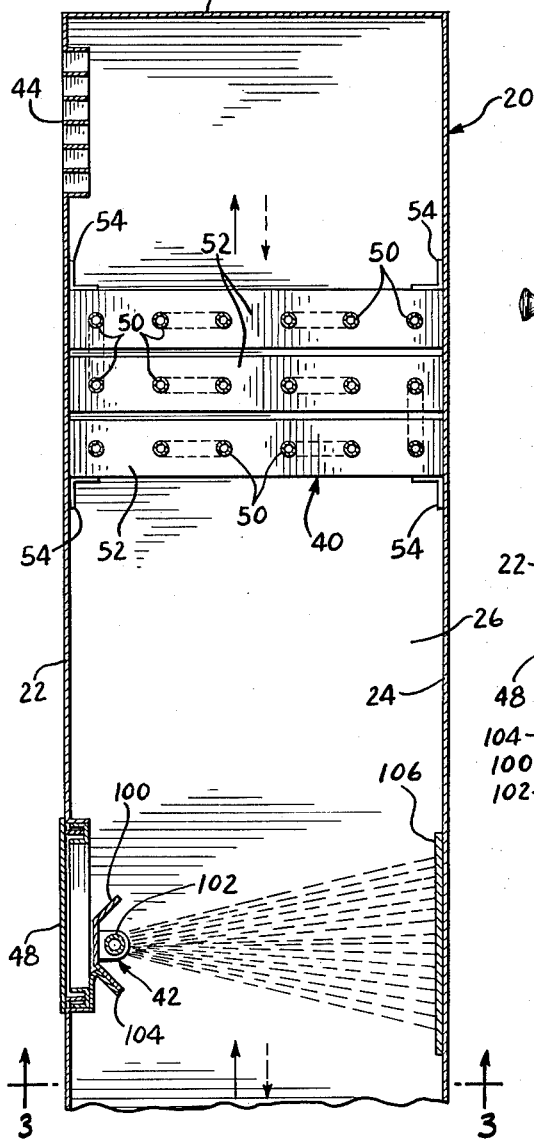
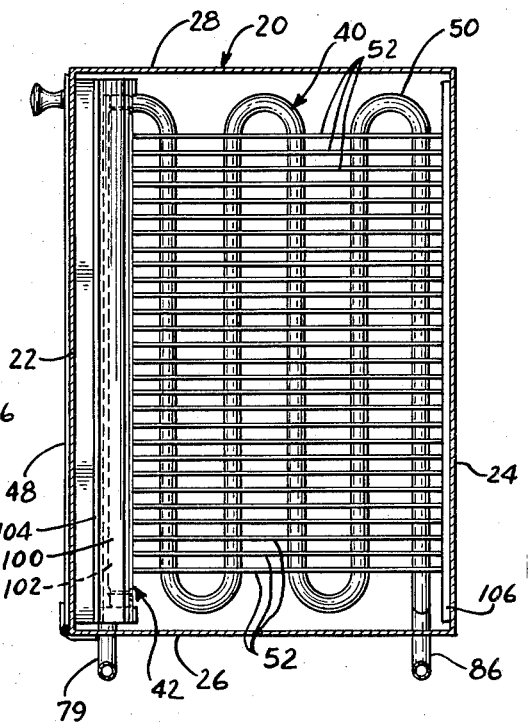
INVENTOR
RICHARD W. KRITZER
by: Norman Gerlach
ATTY.

United States Patent Office 3,100,679
Patented Aug. 13, 1963

3,100,679
APPARATUS FOR PURIFYING AIR IN INHABITABLE OR PRODUCT-CONFINING ENCLOSURES
Richard W. Kritzer, 1355 N. Astor St., Chicago 10, Ill.
Filed Jan. 24, 1961, Ser. No. 84,554
1 Claim. (Cl. 21—74)

The present invention relates to air purification systems, and has particular reference to a method of and an apparatus for purifying the air within an inhabitable or product-confining enclosure.

Within inhabitable enclosures, particularly during cold weather when the enclosures are sealed from a source of outside fresh air, the air is contaminated with germs from human beings and constitutes a menace to good health in that it is capable of carrying infectious organisms into the body. Mold spores and bacteria in the air may cause considerable damage to products, particularly food products, in a wide variety of industries. Such damage takes the form of spoilage and contamination.

Efforts to safeguard the health of human beings and to protect food or other perishable products from bacteriological spoilage by purifying the ambient air has not proven altogether satisfactory in that no means has been devised for purifying all of the air within an inhabitable or other enclosure within a reasonably short period of time.

While there are several methods of purifying air, only two are in general use. These are, namely, air irradiation involving exposure of the air to ultraviolet radiation, and the liberation of nascent oxygen or ozone for commingling with the air to be purified. Other methods such as introducing a germicidal spray into the air to be purified have not proven practical in industrial applications, particularly where an enclosure is continuously inhabited. The air purification system of the present invention is effective both where irradiation and the release of nascent oxygen or ozone is concerned, but it will, for convenience of description, be disclosed in connection with an irradiation process.

In order completely to protect the inhabitants of a given or particular enclosure against exposure to germ-laden air, it is necessary substantially completely to evacuate all of the air within the enclosure and replace the same with purified air within a given period of time, depending, of course, upon the number of inhabitants within the enclosure and the size or capacity of the enclosure. Heretofore, such complete evacuation and replacement of air within a specified period of time has not been attained without removing the occupants of the enclosure during the air purification process, or without subjecting the occupants to discomfort or the danger of direct exposure to ultraviolet radiation.

Among the methods currently in use are direct irradiation of the air within the enclosure by the use of germicidal lamps which are of the mercury arc type and are positioned so as to give an indirect lighting effect to the end that the bodies, and particularly the eyes of the occupants of the enclosure, will not be affected; and, in addition, the creation of forced drafts of purified air into the enclosure, coupled with bleeding of the enclosure for the evacuation of stale or nonpurified air. Neither of these methods, however, is capable of effecting a complete change of air in the enclosure within the period of time necessary properly to safeguard the occupants against exposure to infectious organisms.

Where direct irradiation of the air, utilizing strategically positioned germicidal lamps, is employed, only localized air purification is effected and, in the absence of an artifical air flow within the enclosure, complete air purification is never attained. Where forced air is employed, the purified air which is forcibly injected into the enclosure follows no definite air flow pattern and complete air purification is always a matter of conjecture.

The present invention is designed to overcome the above-noted limitations that are attendant upon the use of conventional air purification systems for the irradiation of air within an enclosure and, toward this end, it contemplates the provision of an air purification and thermal conditioning system wherein the natural thermal flow of confined air through an air duct, initiated solely by a heat exchange device, causes the thus thermally conditioned air to flow through a curtain or zone or ultraviolet radiation for irradiating purposes, after which the purified air is caused to flow into the enclosure under its own impetus at one level within the enclosure, while at the same time, air is withdrawn from the enclosure at another level and returned to the duct for recirculation and irradiation thereof.

Briefly, the invention is predicated upon the thermal behavior of air. It is a well-known principle of thermodynamics that in any given static body of air, a localized region of air which is heated above the temperature of the surrounding air will expand isothermally and, due to the change in its specific gravity, it will rise in the otherwise static body. Conversely, a localized region of air which is cooled below the temperature of the surrounding air will contract and, due to its increased specific gravity, it will fall within the static body. In short, hot air rises while cold air falls within an enclosure where there is a temperature differential. The rate of rise or fall is, of course, a function of the temperature differential involved. Thus, where a quantity of relatively hot air is introduced into an inhabitable enclosure, such as a room, regardless of the level at which it is introduced, it will rise to the fullest extent of which it is capable of rising and will, therefore, collect in the upper regions of the room, i.e., immediately below the ceiling, in the manner of a floating pool or reservoir and will remain at ceiling level as long as the involved temperature differential is sufficiently great as to "float" the body of air on the more dense air which supports it. Conversely, when a localized region of air within a confining static body of air is cooled below the temperature of the confining air, it will fall to the fullest extent of which it is capable and provide a pool or reservoir in the lower regions of the body.

According to the present invention, when there is a demand for heated air within the enclosure, the hot air which has been passed upwardly through the curtain of ultraviolet radiation is discharged from the duct immediately below ceiling level so that this purified air will float on the more dense cooler air which comprises the bulk of the volume of air within the enclosure. As the overlying blanket of purified heated air is thus gradually increased by the addition of air thereto, the depth thereof will gradually increase and the enclosure will tend to become filled by a siphoning action, from the top downward, with such purified and heated air. In the lower regions of the enclosure, the colder and nonpurified air is caused to enter the lower region of the treatment duct where it is induced to rise under the influence of the heat exchange device within the duct so that it will pass through the curtain of ultraviolet radiation and move toward the upper discharge region of the duct. In this manner, a complete evacuation of all of the air within the enclosure and its replacement with purified heated air are effected with certainty and within a shorter time period that has heretofore been attainable utilizing forced air drafts.

Where there is a demand for cold air, as, for example, during summer operation, no change in the equipment involved is necessary for supplying cool purified air to the enclosure and assuring a complete replacement of all of the air within the same over a given period of time. It is merely necessary to supply the heat exchange device within the purification duct with a coolant fluid and the system will become automatically effective gradually to build up a pool of air from floor to ceiling level under the impetus of the natural downward thermal flow of air which takes place within the open-ended duct.

The provision of a system or air conditioning and air purification as briefly outlined above constitutes one of the principal objects of the present invention.

The provision of a system of this character which is extremely simple insofar as the amount of equipment involved is concerned and, therefore, may be manufactured at a low cost; a system which has no moving parts and, therefore, is unlikely to get out of order; a system in which change-over operations from the heating phase to the cooling phase and vice versa may easily be made by the average user; a system wherein the occupants of the enclosure undergoing treatment are not subjected to the exposure of ultraviolet radiation; and a system which, otherwise, is well-adapted to perform the services required of it, are further desirable features which have been borne in mind in the evolvement and development of the present invention.

Other objects and advantages of the invention, not at this time specifically enumerated, will become more readily apparent as the nature of the invention is better understood.

In the accompanying two sheets of drawings forming a part of this specification, a preferred illustrative embodiment of the invention has been shown.

In the drawings:

FIGURE 2 is an enlarged sectional view taken on the line 2—2 of FIGURE 1; and

FIGURE 3 is an enlarged sectional view taken on the line 3—3 of FIGURE 2.

Figure 1:
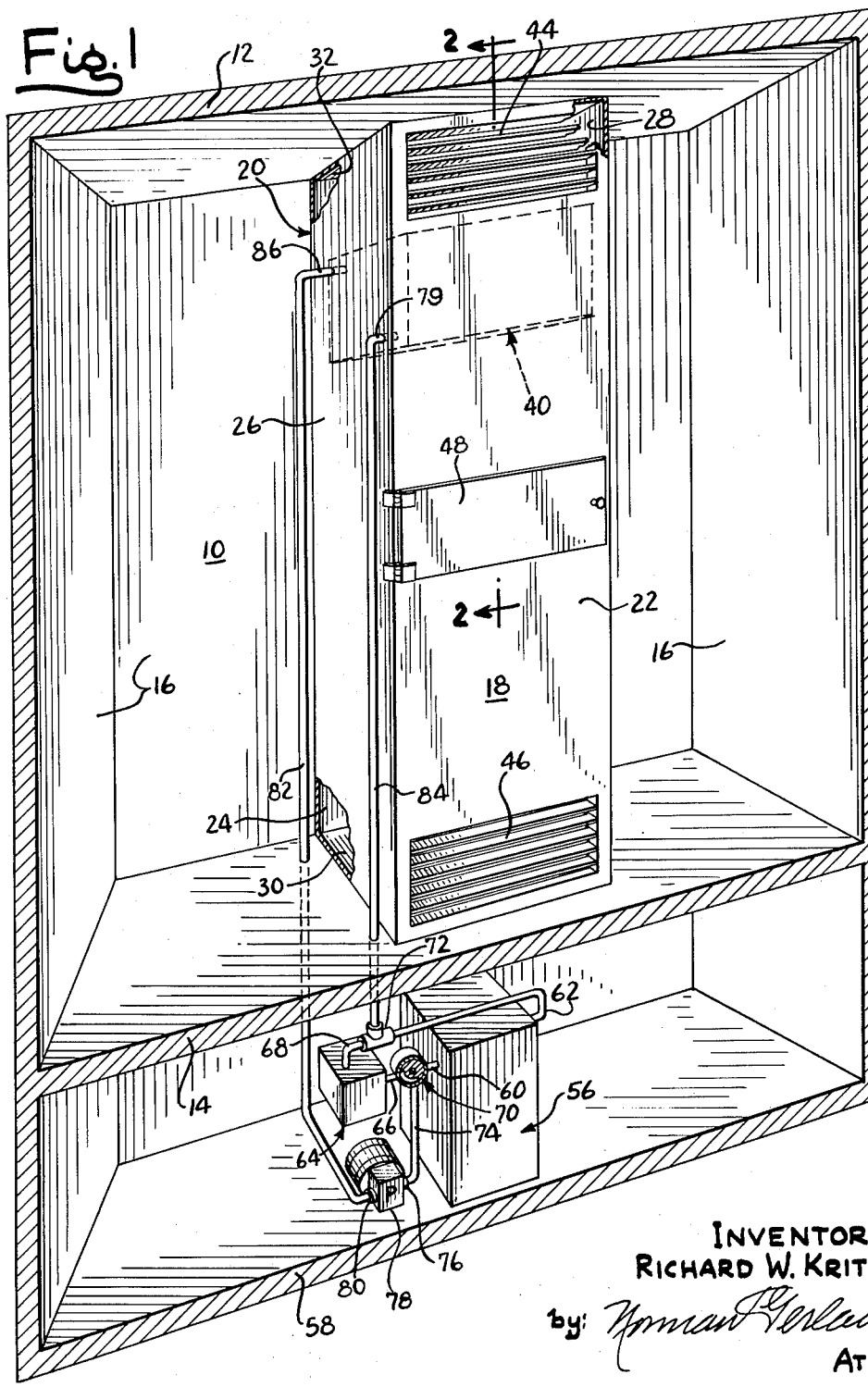
FIGURE 1 is a front perspective view of the air purification and conditioning system or apparatus constructed in accordance with the principles of the present invention and showing the same operatively installed within a room enclosure.

Referring now to the drawings in detail, and in particular to FIGURE 1 wherein an exemplary embodiment of the invention has been shown, an inhabitable enclosure has been designated in its entirety at 10. The enclosure is bounded by a ceiling 12, a floor 14, and a series of vertical interconnecting walls 16, of which only three have been illustrated herein. The air purification and conditioning apparatus of the present invention has been designated in its entirety by the reference numeral 18 and comprises a generally rectangular, vertically elongated, cabinet-type structure which may be formed of sheet metal. Such structure is in the form of a casing 20 having front and rear walls 22 and 24, respectively, side walls 26 and 28, a bottom wall 30, and a top wall 32.

The casing 20 is shown herein as being supported upon the floor 14 adjacent one corner of the enclosure 10 in an out-of-the-way position although it will be understood that it may assume other positions within the enclosure. For example, it may be disposed in a central location within the enclosure; it may be employed as a room divider by extending it outwardly from one wall; it may occupy an entire corner on a diagonal; or it may be concealed or partially concealed behind one of the walls 16 and disposed between adjacent vertical building studs. Irrespective, however, of the particular disposition of the casing within the enclosure, the essential features of the invention are at all times preserved.

The sheet metal structure or casing 20 serves as a housing for two principal components, namely, a heat exchange device 40 and a source of ultraviolet radiation in the form of a conventional germicidal lamp assembly 42. The heat exchange device 40 is shown herein as assuming a position within the casing 20 above the germicidal lamp assembly 42, but this disposition of these two components may, if desired, be reversed with the assembly 42 being disposed above the device 40.

The four walls 22, 24, 26 and 28 of the cabinet 20 form or constitute, in effect, a vertically disposed air duct. A grille or louvered opening 44 is formed in the front wall 22 adjacent to the top thereof and a similar opening 46 is formed in the front wall 22 adjacent to the bottom thereof. The two openings 44 and 46 constitute selective air inlet and discharge openings, as will be described hereafter. A hinged door 48 is provided in the medial regions of the front wall 22 for affording access to the interior of the casing 20 for lamp-changing purposes.

The heat exchange device 40 may be of conventional design. Preferably, it is of the type which is shown and described in my copending patent application Serial No. 82,107, filed on January 11, 1961, and entitled "Fin-Type Heat Exchange Unit With Non-Registering Fin Edges for Frost-Inhibiting Purposes." Such a device is comprised of lengths of serpentine tubing 50 which are connected together in series relationship and have spaced heat-radiating fins 52 secured to, and projecting laterally therefrom. The device 40 is supported within the casing 20 in any suitable manner, as, for example, on angle brackets 54.

Means are provided for selectively supplying heated or chilled water or other liquid to the tubing 50 of the heat exchange device 40. Accordingly, a conventional hot water heater or boiler 56 is mounted on the basement floor 58 and has associated therewith the usual lead-in and lead-out hot water pipes 60 and 62. Similarly, a conventional water cooler or chiller 64 is mounted on the floor 58 and has associated therewith lead-in and lead-out pipes 66 and 68. The two lead-in pipes 60 and 66 are connected to a three-way valve 70. The lead-out pipe 62 of the boiler 56 is connected to one branch of a three-way fitting 72. The lead-out pipe 68 of the cooler 64 is connected to another branch of the three-way fitting 72. The three-way valve is connected through a pipe 74 to the outlet side 76 of a pump 78. The inlet side 80 of the pump 78 is connected to a return pipe 82 leading from the outlet end 86 of the exchange device 40. The third branch of the three-way fitting 72 is connected to a feed pipe 84 leading to the inlet side 98 of the heat exchange device 40. It will be seen, therefore, that by manipulation of the valve 70, either hot or cold water may be forced by the pump 78 through the heat exchange device 40.

The germicidal lamp assembly 42 includes in its general organization, an open-sided, box-like reflector 100, within which there is removably mounted a lamp proper 102. The reflector 100 may be supported within the casing 20 on suitable brackets 104 in such a manner that the ultraviolet rays issuing from the lamp proper 102 are directed transversely across the casing 20 in the form of a narrow curtain of rays through which air flowing upwardly through the casing must pass. To minimize absorption of the ultraviolet rays by the opposite wall 28, a suitable reflector 106 having a polished surface may be mounted on the wall, as shown in FIGURE 3.

The germicidal lamp assembly 42 is of conventional or standard design, various commercial assemblies being available for purposes of ultraviolet ray emission. One such lamp assembly which has been found suitable for this purpose is manufactured and sold by General Electric Company of Schenectady, New York, under the type designation G25T8. A similar lamp assembly is manufactured and sold by Westinghouse Manufacturing Company of Pittsburgh, Pennsylvania under the same type designation and the trade name "Sterilamp." Germicidal lamps are electrically the same as conventional fluorescent lamp and require the same auxiliary equipment, including a starter element and a choke device. They differ physically from fluorescent lamps in that they contain no phosphor and are constructed with a special type of glass which will transmit most of the ultraviolet energy or rays generated by the mercury arc enclosed thereby.

In the operation of the system, according to the present method, during the winter months or at such times as there is a demand for heat within the enclosure, hot water may be supplied and recirculated through the tubing 50 of the heat exchange device 40 by manipulation of the three-way valve 70 so as to exclude the water cooler 64 from the system and to connect the boiler 56 in the system. The heat generated from the tubing and fins of the heat exchange device 40 within the casing 20 will induce a natural upward thermal flow of air within the casing 20 on the basis of the principles of thermodynamics, previously set forth herein, and the rising air will pass upwardly through the curtain of ultraviolet radiation emitted by the germicidal lamp 102 and thus become purified. The purified and heated air will issue from the louvered opening 44 and pass into the enclosure 10 near the ceiling 12. As previously set forth, the thermally initiated siphoning action which subsequently takes place within the enclosure 10 and through the casing 20 will cause complete recirculation of air across the enclosure from top to bottom. Since this recirculation is initiated solely by thermal considerations, no eddy currents are set up which, if present, would churn the air and disturb the even downward flow of purified air from ceiling to floor at all points across the room from wall to wall. At the outset, there is no commingling of purified and non-purified air, the purified air settling downwardly like a slowly descending blanket to displace the nonpurified air therebeneath. The purified air is maintained separated from the nonpurified air along a meniscus-like plane which gradually descends from the ceiling to the floor until all of the nonpurified air has been drawn into the casing 20 through the opening 46 to effect complete evacuation of such air from the enclosure. Thereafter, the enclosure is completely filled with purified air which is slowly recirculated and passed repeatedly through the curtain of ultraviolet radiation which is effected by the lamp proper 102 within the casing 20.

In the operation of the system during the summer months, or at such times as a cooling effect within the enclosure 10 is required, the three-way valve 70 will be manipulated to exclude the boiler 56 and to connect the water cooler 64 in the closed water circulating system leading to the heat exchange device 40. As previously described, the thermally initiated reverse direction siphoning action which takes place incident to extraction of heat from the air within the casing 20 will result in recirculation of air through the enclosure and casing with the air passing upwardly within the enclosure and downwardly within the casing. The air passing downwardly through the curtain of ultraviolet radiation will become purified and this purified air will issue from the opening 46 near the floor 14 of the enclosure where a pool of such purified air will gradually build up to the ceiling with an attendant gradually rising meniscus-like plane of separation between the purified and the nonpurified air. As the purified and chilled air approaches ceiling level, it will be drawn into the casing 20 through the louvered opening 44 for recirculation purposes.

The invention is not to be limited to the exact arrangement of parts shown in the accompanying drawings or described in this specification as various changes in the details of the apparatus or system specifically described and illustrated, and deviations from the exact method outlined herein may be resorted to without departing from the spirit of the invention. For example, while air purification according to the present system has been described in connection with the use of a germicidal lamp which emits ultraviolet rays for irradiation purposes, it is within the purview of the invention to substitute for the germicidal lamp assembly a conventional air purification device which, under the influence of a high voltage discharge liberates ozone or nascent oxygen. In such an instance, the liberated gas commingles with the air rising or falling, as the case may be, within the casing 20 and purifies the same. The purified air is discharged into the enclosure through one or the other of the two louvered openings 44 and 46 in the manner and for the purpose previously described in connection with air purification by irradiation. The invention, therefore, is to be construed only within the scope of the appended claim.

Having thus described the invention what I claim as new and desire to secure by Letters Patent is:

In an air purification and conditioning system of the character described, the combination with an enclosure having a floor, a ceiling, and vertical side walls, a vertically extending, duct-forming air purification conduit having its upper end in fluid communication with the enclosure adjacent to said ceiling and having its lower end in fluid communication with the enclosure adjacent to said floor, said duct being generally rectangular in horizontal cross section and having four vertical side walls, a heat exchange device within the duct, a germicidal lamp within the duct at a region spaced from and below said heat exchange device, said lamp being of elongated design and extending horizontally across the duct in close proximity to and in substantially coextensive relation with one of said side walls and positioned to radiate a curtain of ultraviolet rays substantially completely across the duct transversely thereof in all directions, a reflector having a polished surface positioned on the wall which opposes said one wall and disposed at the level of and in coextensive register with the curtain of ultraviolet rays radiated by said lamp and means for selectively supplying a heating and a cooling medium to said heat exchange device.

References Cited in the file of this patent

UNITED STATES PATENTS

| | | |
|---|---|---|
| 1,932,379 | Ballentine | Oct. 24, 1933 |
| 2,553,711 | Jackson | May 22, 1951 |